United States Patent [19]
Korting

[11] 3,917,363
[45] Nov. 4, 1975

[54] BEARING FOR A CONVEYOR AXLE OF A TRAVELING GRATE
[75] Inventor: Reinhard Korting, Neubeckum, Germany
[73] Assignee: Polysius AG, Neubeckum, Germany
[22] Filed: Sept. 20, 1973
[21] Appl. No.: 398,953

[30] Foreign Application Priority Data
Dec. 7, 1972  Germany.............................. 44838

[52] U.S. Cl................................. 308/35; 29/201 R
[51] Int. Cl.².................. F16C 13/04; F16C 35/00; F16C 39/00
[58] Field of Search............. 308/35, 36.1, DIG. 10; 29/201 R

[56] References Cited
UNITED STATES PATENTS
| 1,742,826 | 1/1930 | Sanders et al. | 308/35 |
| 2,770,270 | 11/1956 | Ottersland | 308/35 |
| 3,227,499 | 1/1966 | Whittum | 308/35 |
| 3,433,540 | 3/1969 | Schneider | 308/36.1 |
| 3,637,272 | 1/1972 | Christiansen | 308/35 |
| 3,708,215 | 1/1973 | Wilcock et al. | 308/35 |

Primary Examiner—Charles J. Myhre
Assistant Examiner—Sheldon Richter
Attorney, Agent, or Firm—Learman & McCulloch

[57] ABSTRACT

Bearing apparatus for the conveyor axle of a traveling grate comprises a primary bearing removably journaling the axle and an auxiliary bearing capable of supporting and journaling the axle while the primary bearing is exchanged.

5 Claims, 1 Drawing Figure

U.S. Patent  Nov. 4, 1975  3,917,363
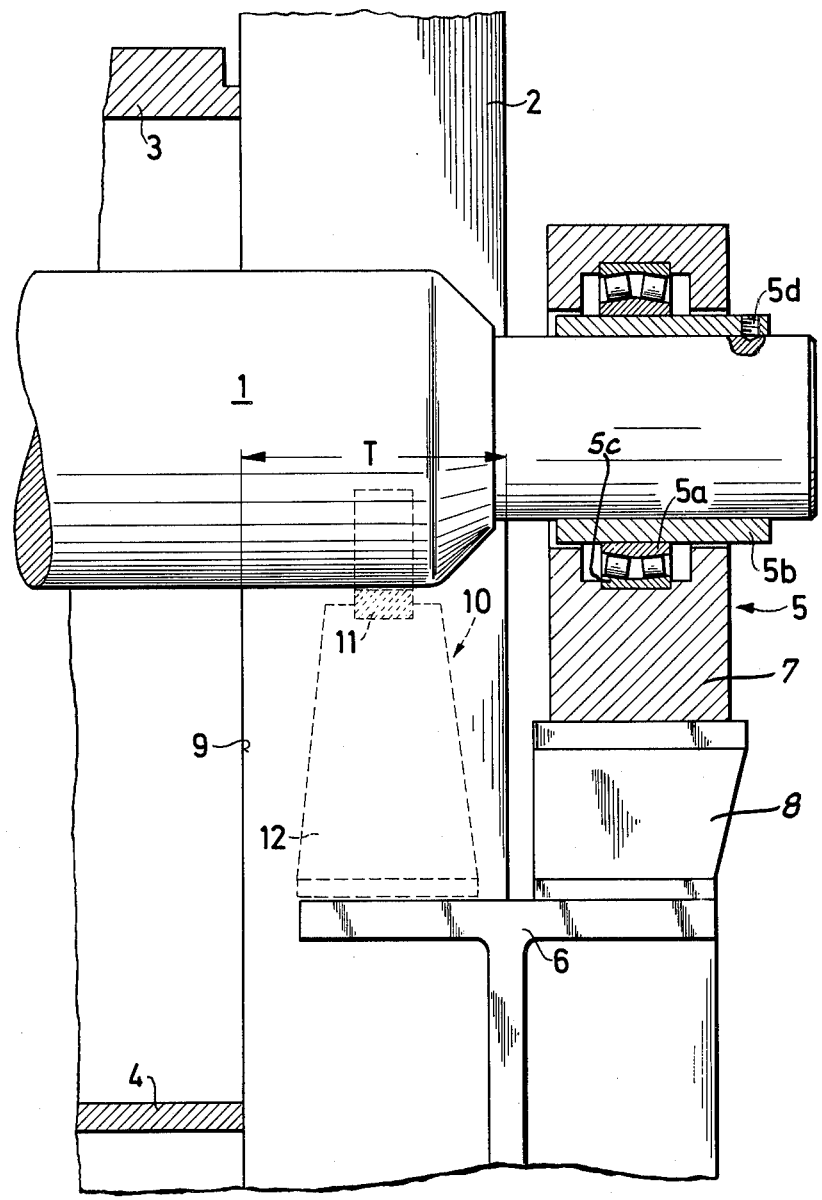

BEARING FOR A CONVEYOR AXLE OF A TRAVELING GRATE

The invention pertains to a bearing for a traveling grate conveyor axle positioned within the stationary casing of the traveling grate.

The chain members of traveling grates generally rest on conveyor rollers attached to the conveyor axles. These conveyor axles are rotatably positioned at their ends in such manner that the bearings are arranged either within the stationary casing of the traveling grate or directly next to the outer wall of the casing.

In the course of operating the traveling grate, service and maintenance work on these bearings is occasionally necessary; once in a while, it is also necessary to exchange a bearing that has become defective. In the case of known constructions, this requires a shut-down of the traveling grate, which amounts to a shut-down of the entire equipment unit.

Accordingly, an object of the present invention is to provide a construction without that disadvantage whereby the bearings of the conveyor axles can be exchanged during continuous operation of the traveling grate.

In accordance with the invention, a section of the conveyor axle between the bearing located outside of the stationary traveling grate casing and the outer casing wall is accessible in such a way that this section of the conveyor axle will accept a secondary support structure which permits removal of the bearing while continuous operation is maintained.

A conveyor axle supported in this manner can continue rotating while the bearing, which is to be serviced or exchanged, can be removed from the conveyor axle as a complete unit. This avoids a shut-down of the traveling grate as well as all the procedural and operational disadvantages connected with the shut-down.

The secondary support structure suitably contains an auxiliary bearing box segment for holding the conveyor axle, for example, a half ring or a quarter ring segment.

The section of the conveyor axle to which the support structure is to be attached is suitably machined as a provisional bearing surface, in order to prevent an undesirably large amount of wear within the area of this section while the conveyor axle is being supported.

An embodiment of the invention is illustrated schematically in the drawing.

The conveyor axle 1 has an end portion that penetrates the stationary casing of the traveling grate end. This casing is shown merely as an outline having a side wall 9 defined by a number of spaced, vertical posts 2, as well as horizontal supports 3, 4.

Outside of casing 2, 3, 4 the end of the conveyor axle 1 is journaled in a bearing 5, which bearing is supported by pillow block 6. The inner ring 5a of the bearing is firmly mounted on conveyor axle 1 by means of sleeve 5b. Conveyor axle 1 is positioned within that sleeve such that it can move axially. For the purpose of preventing a relative rotation of the conveyor axle 1 with respect to sleeve 5b, axle 1 is connected with sleeve 5b by means of a screw or similar removable connecting element 5d. Outer bearing ring 5c is supported by pillow block 6 by means of members 7 and 8, as a consequence of which the axle is horizontal and supported at a predetermined level.

A section T of conveyor axle 1 inwardly of its end and between bearing 5 and the outer wall 9 of the casing is accessible in such a manner that to this section can be attached from below a support structure 10. In the embodiment illustrated, this support structure 10 contains an auxiliary bearing segment 11 (constructed as a half ring or quarter ring), which segment is supported by the same pillow block 6 and support 12. The structure 10 is slidable on the block 6 into and out of supporting engagement with the axle. The bearing segment is capable of supporting the end of the axle at the same level that the latter is supported by the members 5, 7, and 8.

When support structure 10 is attached, then it is possible during continuous operation (in view of the comparatively low rate of revolution of conveyor axle 1), to remove sleeve 5b (by means of its detachable connecting element 5d), the other elements holding bearing 5, whereupon bearing 5 can be removed from the conveyor axle 1 as a complete unit and another bearing 5 substituted for the removed bearing.

What is claimed is:

1. In combination with a rotary, cylindrical, traveling grate axle at least one end of which extends through a casing in which the traveling grate is housed: first bearing means removably encircling said axle adjacent said one end thereof and spaced from said casing; means removably supporting said first bearing means in such position that said one end of said axle normally is at a predetermined level; auxiliary bearing means for supporting and journaling said axle; and removable support means for supporting said auxiliary bearing means from below the latter and supporting said auxiliary bearing means in a position between said first bearing means and said casing with said one end of said axle at said level; said auxiliary bearing means comprising part of a ring formed on an arc corresponding to the curvature of the axle, each of said first and said auxiliary bearing means being removable during rotation of said axle.

2. Apparatus according to claim 1 wherein said auxiliary bearing means comprises a quarter ring.

3. Apparatus according to claim 1 wherein said auxiliary bearing means comprises a half ring.

4. Apparatus according to claim 1 wherein said axle has a smooth surface inwardly of said one end thereof.

5. Apparatus according to claim 1 wherein the supporting means for said first bearing means and the support structure for said auxiliary bearing means include a common member.

* * * * *